United States Patent
Chapin et al.

Patent Number: 5,860,407
Date of Patent: Jan. 19, 1999

[54] GASEOUS FUEL CONTROL SYSTEM FOR ENGINES

[76] Inventors: Lee Chapin, deceased, late of El Paso, Tex.; Lloyd Chapin, legal representative, 705 Winter, El Paso, Tex. 79902

[21] Appl. No.: 910,468

[22] Filed: Jul. 25, 1997

Related U.S. Application Data

[63] Continuation of Ser. No. 329,970, Oct. 26, 1994, abandoned.

[51] Int. Cl.$^6$ ................................................. F02M 21/04
[52] U.S. Cl. ........................... 123/698; 123/527; 123/683; 48/180.1
[58] Field of Search .................... 123/683, 698, 123/527, 528, 529; 48/180.1, 184

[56] References Cited

U.S. PATENT DOCUMENTS

| | | | |
|---|---|---|---|
| 691,529 | 1/1902 | Brophy | 137/625.32 |
| 3,960,126 | 6/1976 | Shinoda | 123/527 |
| 4,351,300 | 9/1982 | Selvidge et al. | 123/527 |
| 4,638,783 | 1/1987 | Snyder | 123/527 |

FOREIGN PATENT DOCUMENTS

| | | | |
|---|---|---|---|
| 0106699 | 4/1984 | European Pat. Off. | 48/180.1 |
| 61-252860 | 11/1986 | Japan | 123/527 |

*Primary Examiner*—Andrew M. Dolinar
*Attorney, Agent, or Firm*—Fitch, Even, Tabin & Flannery

[57] ABSTRACT

A gaseous fuel control system for engines for delivering and regulating fuel and air flows to the engine and an electronically controlled rotary pressure regulator implementing fine adjustments in the pre-mixing pressure of gaseous fuel. Gaseous fuel from a high-pressure fuel tank is forced into a passage and through a series of pressure regulators during combustion. Inside a throttle body, butterfly plates respond to signals from an electronic controller to regulate the flows of air and gaseous fuel. The fuel passes into a stagnation chamber and mixes with the air flow through a series of radial mixing orifices in a common wall between the stagnation chamber and air passageways. The fuel/air ratio is coarsely controlled by the reaction of the butterfly plates to the signals of the electronic controller and is more finely controlled by electronic rotation of the rotary gas pressure regulator.

12 Claims, 5 Drawing Sheets

GASEOUS FUEL CONTROL SYSTEM FOR ENGINES

This application is a continuation of application Ser. No. 08/329,970, filed Oct. 26, 1994, now abandoned.

BACKGROUND OF THE INVENTION

The invention relates generally to a throttle for gaseous fuel control for gaseously fueled engines. Such engines have existed, even in vehicles, for many years, and augmented future reliance is anticipated given the current availability and usage rates of fuel sources such as liquid petroleum gas. Compressed natural gas, used as a substitute for liquid petroleum gas, has several advantages. It is more abundantly found in our environment, it is less expensive to buy the requisite fuel to traverse a given distance, and it is a cleaner burning fuel since there is much less carbon present in the combustion chamber.

The most common gaseous fuel carburetor systems were developed for liquified petroleum gas. If modified to handle the greater flow required for compressed natural gas, these carburetor systems function, but they are undersized, and they produce substandard emissions.

One type of gaseous fuel carburetor is the venturi model where a constricted air passageway causes an increase in air flow rate and a corresponding decrease in pressure. Openings in the venturi throat allow gaseous fuel to be pulled in by the lower pressure flowing air. Such a method is discussed in Dutch Patent No. NL 8603-136-A.

To determine the requirements of the engine, some systems use an air flow transducer to measure the air being used by the engine. These air flow transducers, however, have cost, life and accuracy problems. Others systems "map" the engine and derive air flow from a table of engine characteristics. The engine "map" method may achieve good results if the engine has no variable characteristics, but each installation must be "mapped". Such a system may be adequate for high production volumes, but it definitely limits versatility. Fluidic control systems let the air flow generate a signal or operator that governs gas flow, such as a venturi or air-operated trap door. These systems have tracking and linearity problems.

Hence, there is a need for a gaseous fuel control system which can efficiently regulate and accurately adjust to the needs of the engine.

SUMMARY OF THE INVENTION

There is provided a gaseous fuel control system for engines for delivering and regulating gaseous fuel and air flows to the engine, and there is also provided an electronically controlled rotary pressure regulator for implementing fine adjustments in the pre-mixing pressure of gaseous fuel.

Gaseous fuel is stored in high-pressure fuel tanks in the vehicle. During operation, the fuel is permitted to flow into a gaseous fuel passage and through one or more pressure regulators and one or more heat exchangers to substantially equate the pressure and temperature of the gaseous fuel with the pressure and temperature of the outside air entering the air passages.

Preferably, inside the entrance to the throttle body is a gas-filled, rotary pressure regulator having narrow slots through which the gaseous fuel must exit when the slots align with similar longitudinal slots in the cylindrical housing for the rotor. Inside the throttle body are butterfly plates which serve to open and close the fuel and air passageways as needed to produce the power required from the engine, regulating the incoming flows.

A central processor is the cornerstone of a feedback loop having multiple inputs for accumulating data concerning the performance of the system and multiple outputs for effectuating changes in the system when appropriate. The output signal is a compound function dependent on input signals from the accelerator of the vehicle, the operating speed of the engine, and an exhaust oxygen sensor. The processor emits signals which control the gaseous fuel inlet pressure to the throttle body, the degree of obstruction of air and gas passageways by the butterfly plates, and, in one embodiment, a fuel injection mechanism.

The pressure-regulated gaseous fuel flows through part of the throttle body and into a stagnation chamber surrounding the adjoining air passages. The gaseous fuel is permitted to enter the air flow through a series of radial mixing orifices in the walls between the stagnation chamber and the air passageways. Unlike a venturi arrangement, where gaseous fuel is drawn into a relatively high velocity, low pressure airflow, the fuel/air ratio is primarily maintained by slaved butterfly valves on the throttle, while finer control of the ratio is accomplished by increasing or decreasing the pressure of the gaseous fuel by variation of upstream flow conditions. In one embodiment, the finer control is effected by the angular rotation of a rotary pressure regulator.

Also unlike a venturi arrangement, the air passageway cross-section is preferably not restricted adjacent the radial mixing orifices. The fuel/air ratio is substantially maintained downstream by the slaved angular rotation of the throttle butterfly plates, however, one embodiment of the invention includes an electronic gaseous fuel injector to apply fuel directly downstream for even finer tuning the ratio of the mixture.

DETAILED DESCRIPTION OF PREFERRED EMBODIMENTS

The invention is preferably embodied in a system for regulating flow of gaseous fuel for internal combustion engines, and the invention may be embodied in single barrel or multiple barrel throttle bodies.

Figure 1:
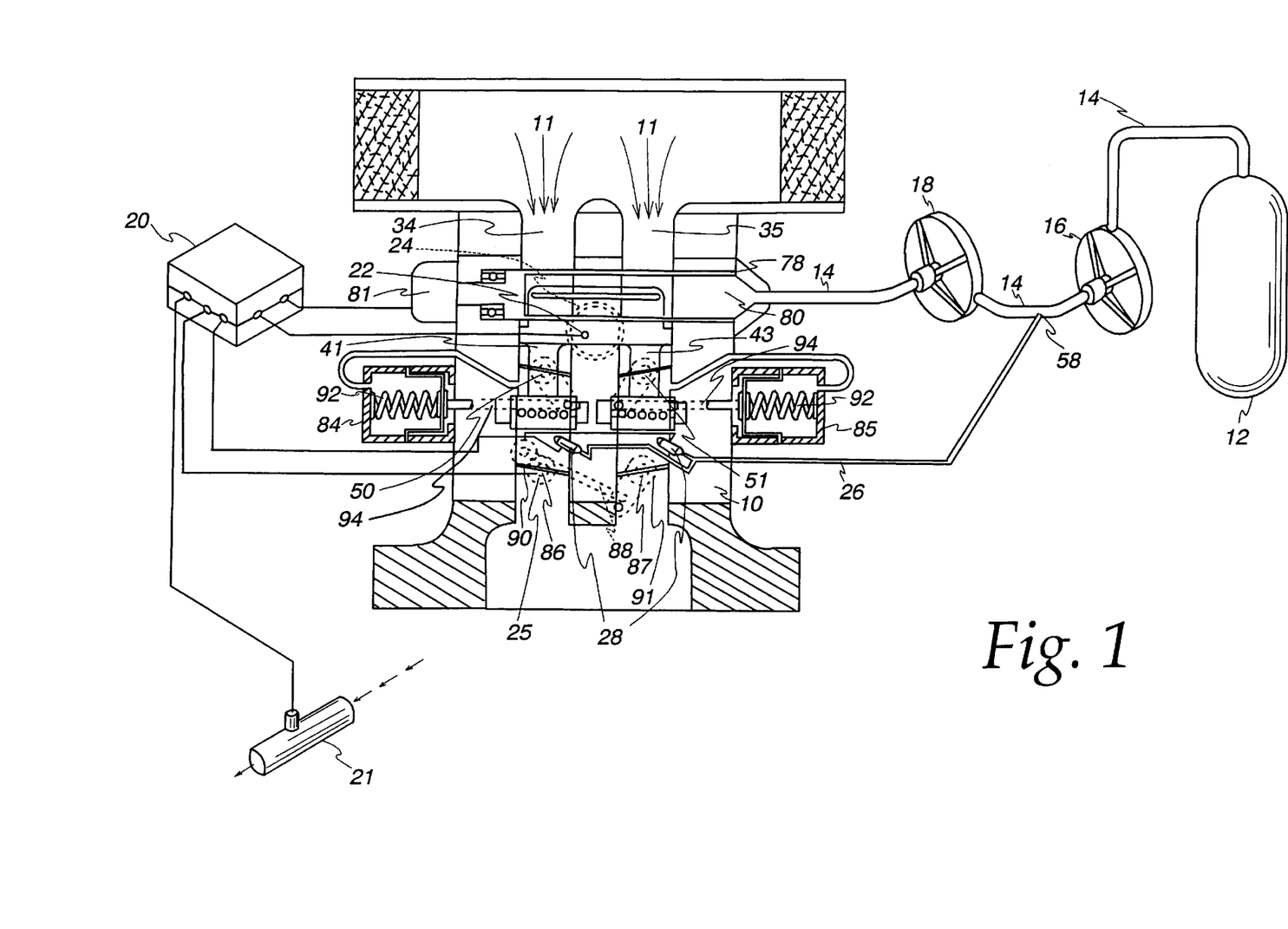
FIG. 1 is a schematic view of a gaseous fuel control system in accordance with the invention.

A first embodiment of the invention comprises a gaseous fuel controller which includes a four-barrel throttle body 10, a gaseous fuel storage tank 12 capable of storing high-pressure compressed or liquified natural gas, and a gaseous fuel line 14 for delivery of the natural gas to the throttle body 10. A primary pressure regulator/heat exchanger 16 lowers the pressure of the compressed natural gas exiting the tank 12 to an intermediate pressure, and a secondary pressure regulator/heat exchanger 18 further reduces the pressure of gaseous fuel being delivered to the throttle body 10. Both regulator/heat exchangers 16, 18 add heat to the expanding gaseous fuel to maintain the gaseous fuel at an acceptable temperature.

Inside the throttle body, a rotary, cylindrical pressure-regulating rotor 80 makes finer adjustments in the fuel pressure. Within or near the cylindrical pressure-regulating rotor 80, a temperature sensor 22 and a pressure sensor 24 provide feedback information to an electronic controller 20 which adjusts the resultant fuel/air mixture. A throttle pitch indicator 25 relays data to the electronic controller 20 regarding the power demand of the accelerator. A fuel injection line 26 and an electronic fuel injector 28 may be provided to enrich the fuel/air mixture at appropriate times.

Compressed or liquified natural gas is stored in a gaseous fuel storage tank 12 at a pressure between 100 and 4000 psi. Gaseous fuel is released into a gaseous fuel line 14 where it enters into a primary pressure regulator/heat exchanger 16 where the pressure is reduced to 100 psi and heat is added to maintain the temperature of the gaseous fuel at an acceptable level. The gaseous fuel continues in the gaseous fuel line 14 and enters a secondary pressure regulator/heat exchanger 18 where the pressure is reduced to between 0 and 5 psi (gauge) and the temperature of the gaseous fuel is equated, by use of the temperature sensor 22, to the temperature of the air 11 entering the throttle body 10.

Figure 2:
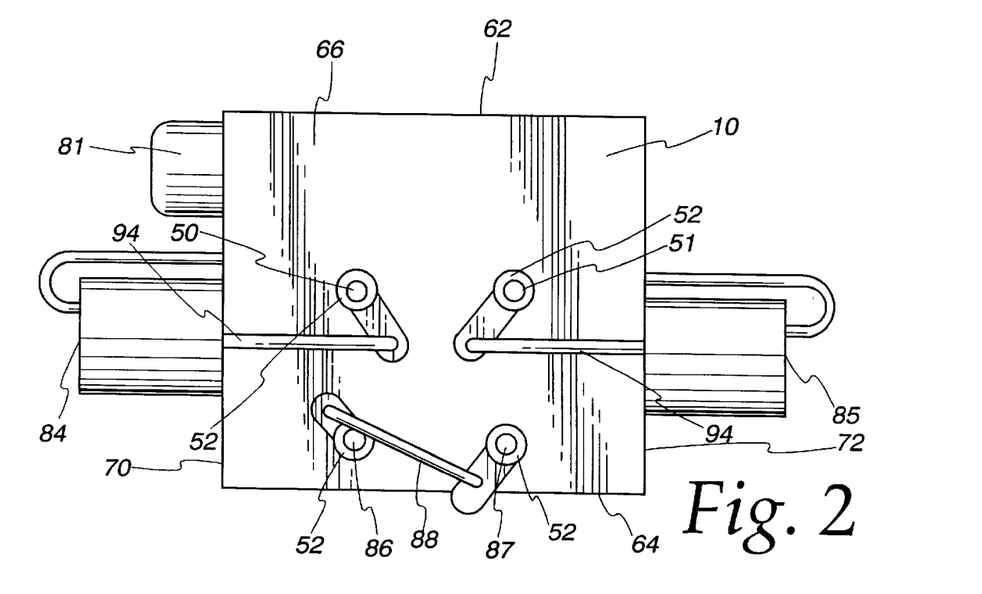
FIG. 2 is a front elevational view of a throttle body in accordance with the gaseous fuel control system of FIG. 1.
Figure 3:
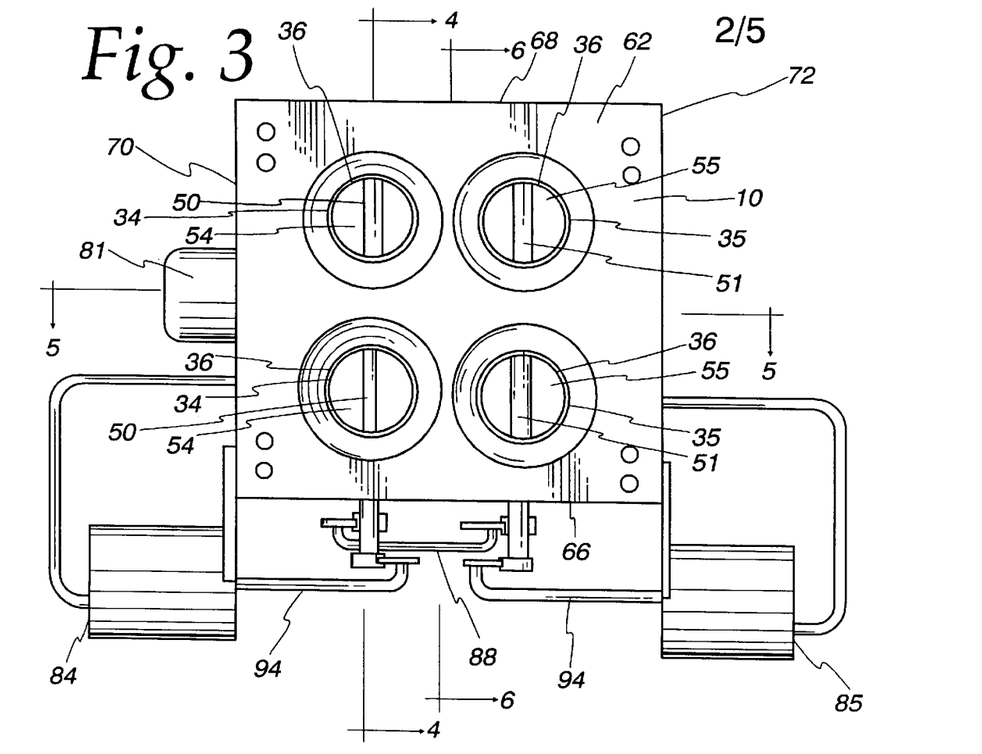
FIG. 3 is a top plan view of the throttle body of FIG. 2.

The gaseous fuel then enters the throttle body 10, which is substantially rectangularly prismatic, having opposing top and bottom surfaces, 62 and 64 respectively, front and rear surfaces, 66 and 68 respectively, and left and right side surfaces, 70 and 72 respectively. Two primary air passageways 34 and two secondary air passageways 35, defined by air passageway walls 36, extend vertically from the top surface 62 to the bottom surface 64 of the throttle body 10. At the top of the air passageways 34, 35 are air passageway inlet openings 38, which are flared outwardly to meet the top surface 62 of the throttle body 10.

Figure 4:
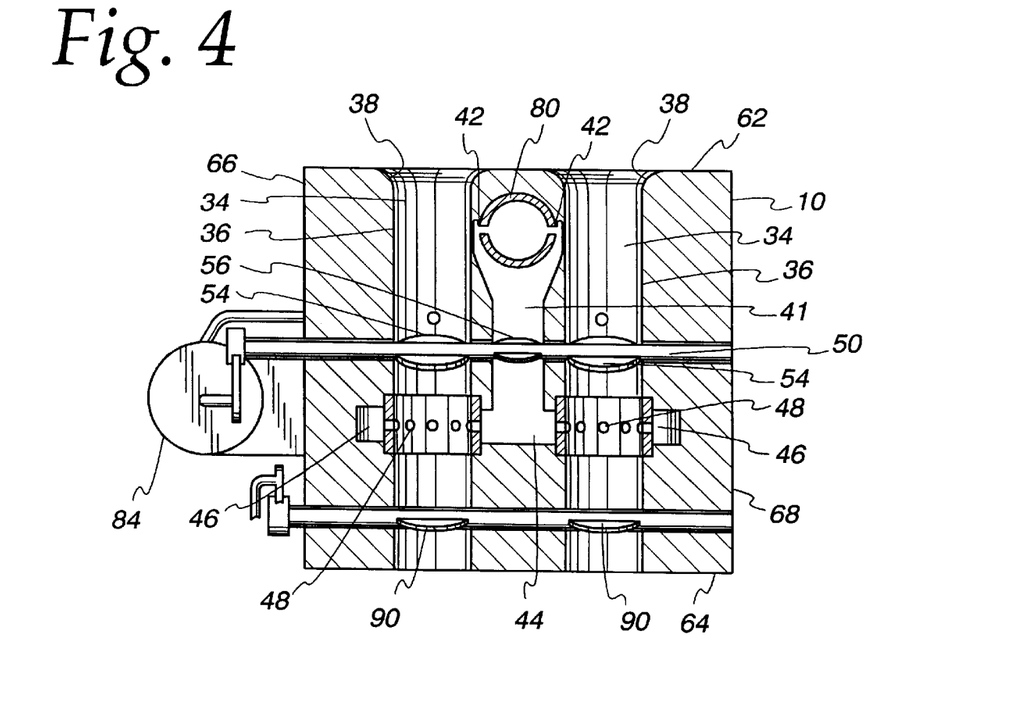
FIG. 4 is a cross-sectional view taken substantially along the line 4—4 in FIG. 3.

Gaseous fuel flows from the gaseous fuel line 14 into a precision electronically-controlled pressure-regulating rotor 80 housed in a hollow cylinder 78 in the throttle body 10. The electronically-controlled rotary actuator 81 has between thirty-five and forty degrees of angular travel and is directly connected to the pressure-regulating rotor 80. The rotor is suspended in the cylinder 78 on ball bearings for low rotational drag, or, in another embodiment, a low-friction coating is applied to the cylinder 78. The gaseous fuel is regulated to a pressure approximating outside air pressure as it exits the rotor 80 through longitudinal rotor slots 82 in each side of its exterior wall. These rotor slots 82 align in varying degrees, per the electronic controller 20 affecting the rotary actuator 81, with corresponding longitudinal cylinder slots 83 in the cylinder 78. The alignment of the rotor slots 82 with the cylinder slots 83 forms gaseous fuel passageway inlet openings 42. When closing the openings 42, the rotor 80 rotates approximately 5 degrees past the closing point where the edges of the rotor slots 82 and the edges of the cylinder slots 83 align. The gaseous fuel passes through the openings 42, continues into a plenum 15 and then into the primary gaseous fuel passageways 41 and the secondary gaseous fuel passageways 43.

In the primary gaseous fuel passageway 41, the gaseous fuel is partially obstructed by the primary gaseous fuel passageway butterfly plate 56 attached to the primary metering shaft 50. The degree of obstruction effected by rotation of the primary metering shaft 50, is controlled by the primary vacuum pressure actuator 84.

In the secondary gaseous fuel passageway 43, the gaseous fuel is partially obstructed by the secondary gaseous fuel passageway butterfly plate 57 attached to the secondary metering shaft 51. The degree of obstruction effected by rotation of the secondary metering shaft 51 is controlled by the secondary vacuum pressure actuator 85.

Figure 6:
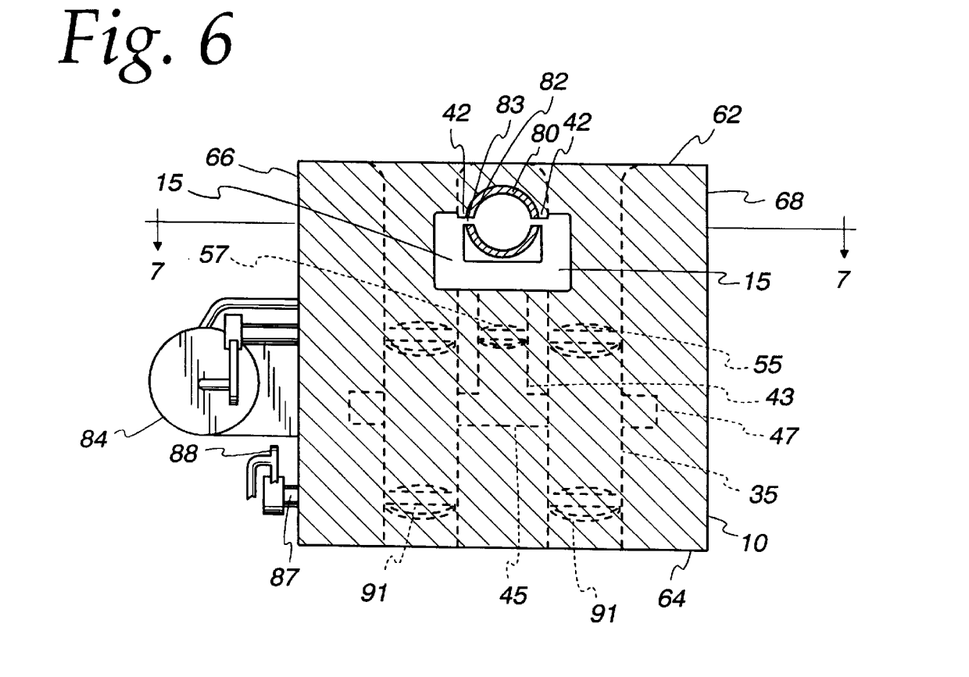
FIG. 6 is a cross-sectional view taken substantially along the line 6—6 in FIG. 3.
Figure 7:
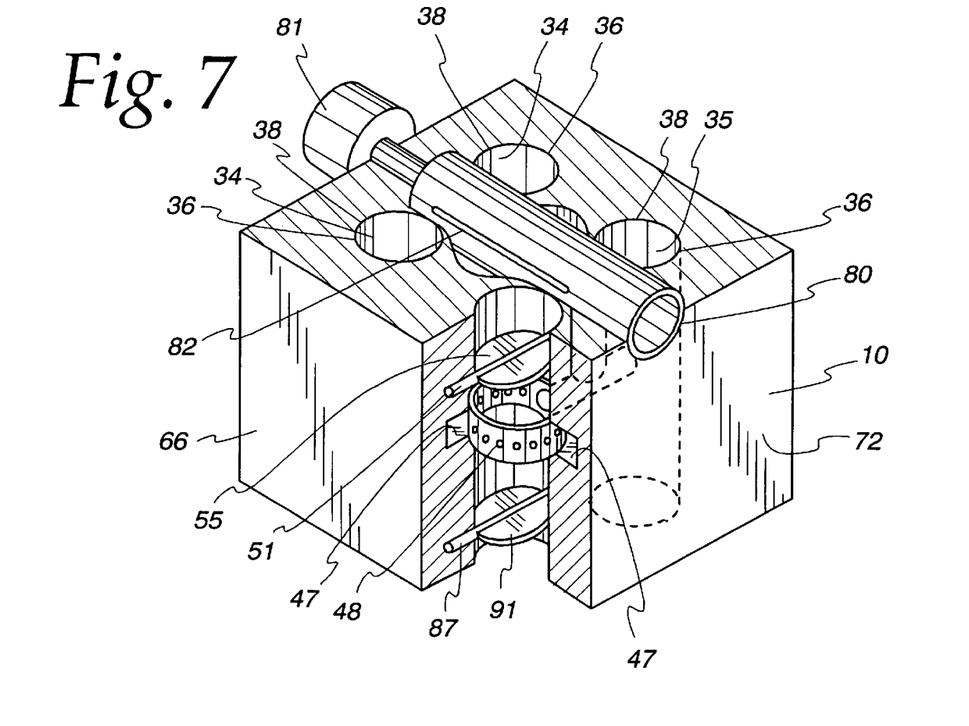
FIG. 7 is a perspective view of a section of the throttle body of FIG. 6.

The primary gaseous fuel passageway 41 terminates in a primary pre-mixing stagnation chamber 44, centrally located between the two primary air passageways 34. The primary stagnation chamber 44 extends from the end of the primary gaseous fuel passageway 41 into primary ringed passageways 46 which encircle each of the air passageway walls 36 near the bottom of the primary air passageways 34. Over the length of air passageway walls 36 adjacent to the primary ringed passageways 46, there are radial mixing orifices 48 substantially evenly spaced along the circumference of the air passageway walls 36, permitting the flow of gaseous fuel from the primary ringed passageways 46 into the primary air passageways 34. After then passing the primary throttle shaft 86 and the attached primary throttle butterfly plates 90, the resultant fuel/air mixture exits the throttle body 10 through the outlets of the primary air passageways 34 at the bottom of the throttle body 10.

Figure 5:
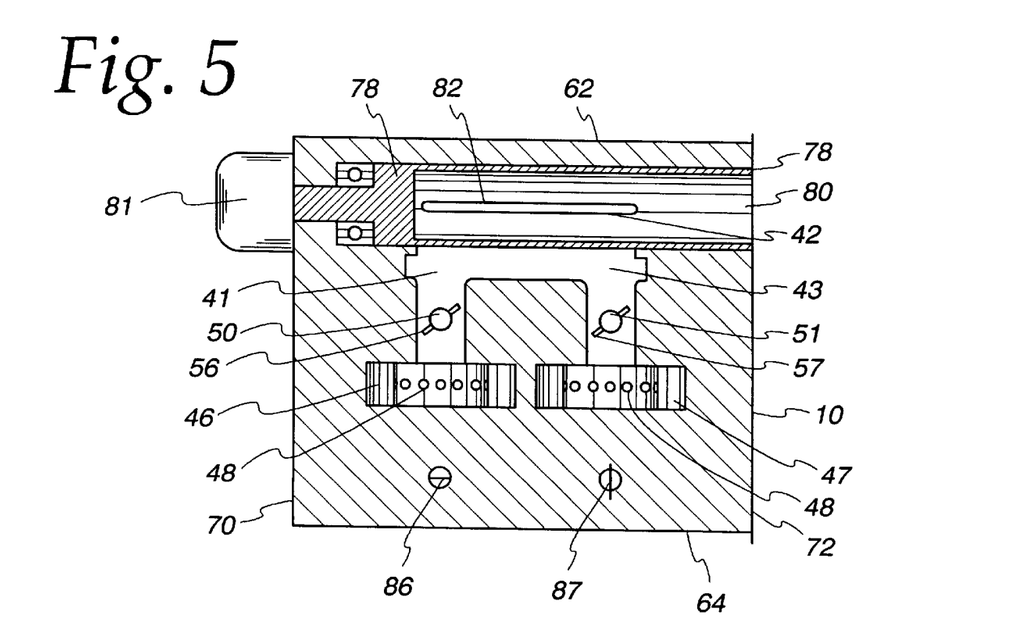
FIG. 5 is a cross-sectional view taken substantially along the line 5—5 in FIG. 3.

A similar arrangement is provided for the mixing of secondary gaseous fuel and air. The secondary gaseous fuel passageway 43 terminates in a secondary pre-mixing stagnation chamber, centrally located between the two secondary air passageways 35. The secondary stagnation chamber extends from the end of the secondary gaseous fuel passageway 43 into secondary ringed passageways 47 which encircle each of the air passageway walls 36 near the bottom of the secondary air passageways 35. Over the length of air passageway walls 36 adjacent to the secondary ringed passageways 47, there are radial mixing orifices 48 substantially evenly spaced along the circumference of the air passageway walls 36. Gaseous fuel flows from the secondary gaseous fuel passageway 43 into the secondary stagnation chamber and secondary ringed passageways 47 and finally through the mixing orifices 48 into the secondary air passageways 35. After then passing the secondary throttle shaft 87 and the attached secondary throttle butterfly plates 91, the resultant fuel/air mixture exits the throttle body 10 through the outlets of the secondary air passageways 35 at the bottom of the throttle body 10.

Passing through the throttle body 10 are a primary metering shaft 50 and a secondary metering shaft 51. They are oriented so that they pass through the two lateral side surfaces, 70 and 72, of the throttle body 10 which are adjacent to the lateral front surface 66 from which the gaseous fuel enters the throttle body 10, and they are substantially perpendicular to side surfaces 70 and 72. The metering shafts 50, 51 are constrained to axial rotation by shaft mounts 52 attached to the throttle body 10. The metering shafts 50, 51 are controlled by reaction of the primary and secondary vacuum pressure actuators 84 and 85, respectively.

The primary metering shaft 50 passes through both primary air passageways 34 and, between them, the primary gaseous fuel passageway 41. Where the shaft 50 passes through the primary air passageways 34, affixed to the shaft 50 and supported by a longitudinal slot extending through the center of its substantially circular cross section, there are substantially circular primary air passageway butterfly plates 54 that rotate with the shaft 50 in order to variably obstruct air flow through the primary air passageways 34. Where the primary metering shaft 50 passes through the primary gaseous fuel passageway 41, there is similarly affixed to the primary metering shaft 50 a substantially circular primary gaseous fuel passageway butterfly plate 56 that also rotates with the shaft in order to correlatively obstruct amounts flow through the primary gaseous fuel passageway 41.

The secondary metering shaft 51 passes through both secondary air passageways 35 and, between them, the secondary gaseous fuel passageway 43. Where it passes through the secondary air passageways 35, affixed to the secondary metering shaft 51 and supported by a longitudinal slot extending through the center of its substantially circular cross-section, there are substantially circular secondary air passageway butterfly plates 55 that rotate with the shaft in order to variably obstruct air flow through the secondary air passageways 35. Where the secondary metering shaft 51 passes through the secondary gaseous fuel passageway 43, there is similarly affixed to the secondary metering shaft 51 a substantially circular secondary gaseous fuel passageway butterfly plate 57 that also rotates with the shaft in order to correlatively obstruct gaseous fuel flow through the secondary gaseous fuel passageway 43.

An electronic controller 20 serves to fine tune the fuel/air mixture control for the engine. The principal input of the electronic controller 20 is an exhaust oxygen sensor 21 which monitors the performance of the engine. The electronic controller 20 also receives as inputs data from the temperature sensor 22 and the pressure sensor 24 which take measurements of the gaseous fuel as it exits the precision electronic rotary pressure-regulating rotor 80. In one embodiment, engine speed and primary throttle position are additional inputs of the electronic controller 20. In response to these inputs, the electronic controller 20 effects changes in the rotational position of the pressure-regulating rotor 80 through the rotary actuator 81 in order to adjust the resultant fuel/air mixture. The electronic controller 20 aggregates data from the inputs, makes relevant calculations, and generates appropriate output signals to effectuate changes in the system through the rotary actuator 81 and any other implementing devices. In one embodiment, the electronic controller 20 effects very fine adjustments in the fuel/air mixture through additional control of a downstream electronic fuel injector 28. The sensors, electronic controller, and actuators interact to form an electronic feedback loop which makes substantially continuous corrections in the relevant parameters of the gaseous fuel control system.

Passing through the throttle body 10 are a primary throttle shaft 86 and a secondary throttle shaft 87. They are oriented so that they pass through the two lateral side surfaces, 70 and 72, of the throttle body 10 which are adjacent to the lateral front surface 66 from which the gaseous fuel enters the throttle body 10, and the throttle shafts 86, 87 are substantially perpendicular to side surfaces 70 and 72. The throttle shafts 86, 87 are constrained to axial rotation by shaft mounts 52 attached to the throttle body 10.

The primary throttle shaft 86 passes through both primary air passageways 34. Affixed to the primary throttle shaft 86, supported by a longitudinal slot extending through the center of its substantially circular cross-section within the primary air passageways 34, are substantially circular primary throttle butterfly plates 90 that rotate with the shaft in order to variably obstruct flow exiting the primary air passageways 34.

The secondary throttle shaft 87 passes through both secondary air passageways 35. Affixed to the secondary throttle shaft 87, supported by a longitudinal slot extending through the center of its substantially circular cross-section within the secondary air passageways 35, are substantially circular secondary throttle butterfly plates 91 that rotate with the shaft in order to variably obstruct flow exiting the secondary air passageways 35.

The primary throttle shaft 86 is connected directly to the acceleration control means of the vehicle and rotates to cause the primary throttle butterfly plates 90 to be less obstructing when the foot pedal is pressed down for acceleration. The secondary throttle shaft 87 is connected to the primary throttle shaft 86 by an throttle shaft linkage 88 which, in order to give the operator finer control over the power output at lower power requirements delays rotation of the secondary throttle shaft 87 until the primary throttle shaft 86 has rotated sufficiently to permit a predetermined amount of mixture flow. The linkage 88 also causes the secondary throttle shaft to rotate more quickly after this point is reached, causing both throttle shafts 86, 87 to allow full mixture flow, by aligning the butterfly plates 90, 91 with the flow, substantially simultaneously.

With the throttle shafts 86, 87 oriented so that the mixture flow is minimal, an engine can produce a very low pressure in its intake manifold. Upon sudden rotation of the throttle butterfly plates 90, 91, the air and gaseous fuel sources can be transiently affected by the contact with the low pressure region. This places an additional demand on the electronic controller 20. To limit the effect of these transients, the metering shafts 50, 51 are isolated from the throttle shafts 86, 87. The metering shafts 50, 51 are separately actuated by the pressure drop across the metering shafts' butterfly plates 54–57. Because of the delay built into the throttle shaft linkage 88, the transient pockets of variable pressure within the primary air passageway 34 will differ from those in the secondary air passageway 35; thus, a primary vacuum pressure actuator 84 reacts with pressure transients in the primary air passageway 34 and a secondary vacuum pressure actuator 85 reacts with pressure transients in the secondary air passageway 35.

Each actuator 84, 85 has a diaphragm 96 and 97, respectively, separating any transient pressure zone from a normalized pressure region. The relative difference in pressures implements a force in opposition to the corresponding actuator spring 92 and forces the spring into equilibrium, balancing the spring force against the force created by the pressure transient. The lateral shift of position in the spring 92 effects a similar shift in the corresponding metering shaft lever arm, gradually rotating the shaft until the pressure transient is reduced.

In the embodiment of FIG. 1, the electronic controller 20 includes means for the direct input of gaseous fuel into the stagnation chambers downstream of the gaseous fuel passageway butterfly plates 56, 57 in order to facilitate finer control of the proper fuel/air ratio. That embodiment includes a fuel injection branch node 58 along the gaseous fuel line 14 between the primary pressure regulator/heat exchanger 16 and the secondary pressure regulator/heat exchanger 18 whereby some of the gaseous fuel is diverted into a fuel injection line 26. The gaseous fuel travels along the fuel injection line 26 to an electronic fuel injector 28, which, upon receiving appropriate signals from the electronic controller 20, injects an appropriate supplement of gaseous fuel into the stagnation chambers, enriching the gas-to-air ratio of the mixture.

Figure 8:
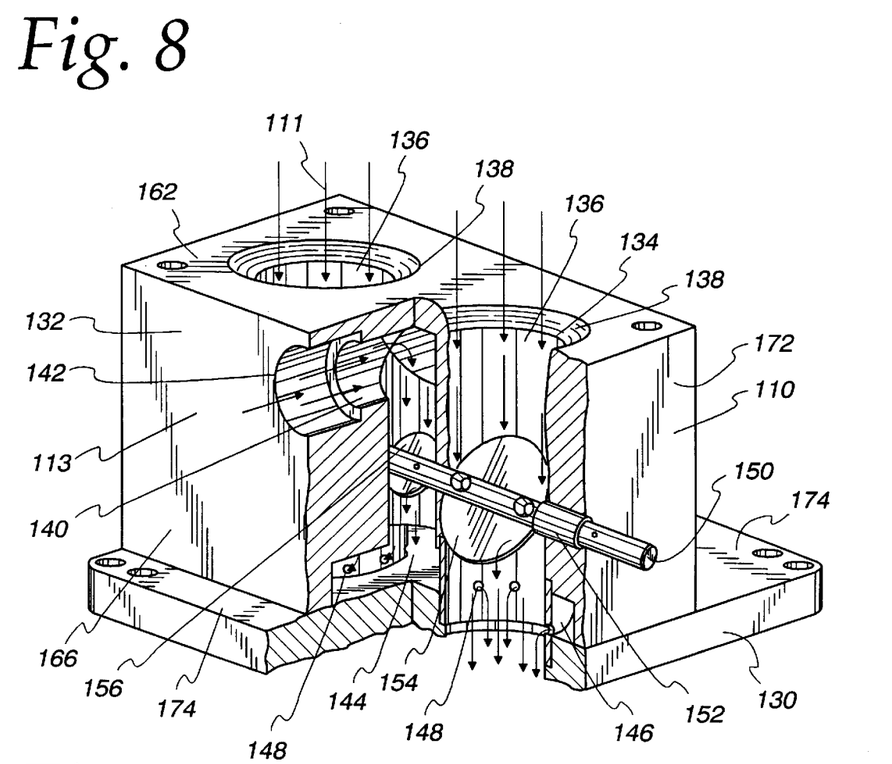
FIG. 8 is a perspective view of a throttle body in accordance with a separate embodiment of the invention.
Figure 9:
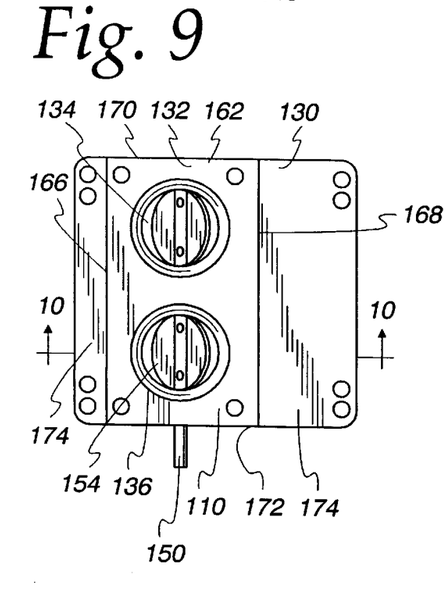
FIG. 9 is a top plan view of the throttle body of FIG. 8.
Figure 10:
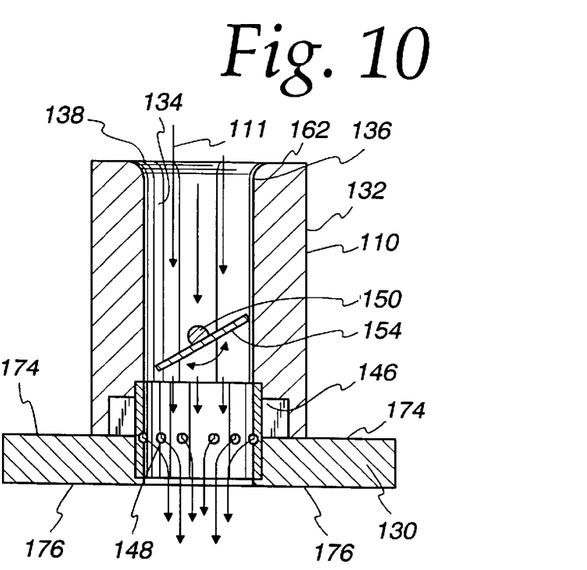
FIG. 10 is a cross-sectional view taken substantially along the line 10—10 in FIG. 9.

Another embodiment of the invention, illustrated in FIGS. 8–10, comprises a gaseous fuel control system which includes a two-barrel throttle body 110, a gaseous fuel storage tank capable of storing high-pressure compressed natural gas, a gaseous fuel line for delivery of the natural gas to the throttle body 110, a primary pressure regulator/heat exchanger to lower the pressure of the compressed natural gas exiting the tank, a secondary pressure regulator/heat exchanger to further reduce the pressure of gaseous fuel being delivered to the throttle body 110, an electronic controller for adjusting the ratio of the fuel/air mixture entering the throttle body 110, a temperature sensor, a pressure sensor, a throttle pitch indicator, and, in one embodiment, a fuel injection line and an electronic fuel injector.

The apparatus and flow upstream of the throttle body in FIGS. 8–10 is very similar to that of the preferred embodiment. Compressed natural gas is stored in a gaseous fuel storage tank at a pressure between 100 and 4000 psi. The gaseous fuel is released into a gaseous fuel line where it enters into a primary pressure regulator/heat exchanger which reduces the pressure to 100 psi. The gaseous fuel continues in the gaseous fuel line and enters a secondary pressure regulator/heat exchanger where the pressure is reduced to 0 psi (gauge) and the temperature of the gaseous fuel is equated, by use of the temperature sensor, to the temperature of the air entering the throttle body 110.

The gaseous fuel then enters the throttle body 110, which comprises a substantially rectangular base 130, having top and bottom surfaces, 174 and 176 respectively, and a substantially rectangularly prismatic upper part 132 having six surfaces, opposing top and bottom surfaces, 162 and 164 respectively, and four lateral surfaces, including front and rear surfaces, 166 and 168 respectively, and left and right side surfaces, 170 and 172 respectively. The bottom surface 164 of the upper part 132 is abutted against the top surface 174 of the base 130. Substantially circular air passageways 134, defined by air passageway walls 136, extend vertically from the top surface 162 to the bottom surface 164 of the upper part 132. At the top of the air passageways 134 are air passageway inlet openings 138, which are flared outwardly to meet the top surface of the upper part 132. A substantially circular gaseous fuel passageway 140 extends through the body 132, having a substantially circular gaseous fuel passageway inlet opening 142 on the lateral front surface 166 of the body 132. The gaseous fuel passageway 140 bends at a substantially right angle so that beyond the inlet opening 138 it is parallel and adjacent to the air passageways 134.

The gaseous fuel passageway 140 terminates in a premixing stagnation chamber 144 located at the bottom of the upper part 132. The stagnation chamber 144 extends from the end of the gaseous fuel passageway 140 into ringed passageways 146 which encircle each of the air passageway walls 136 near the bottom of the air passageways 134. Over the length of air passageway walls 136 adjacent to the ringed passageway 146 there are radial mixing orifices 148 substantially evenly spaced along the circumference of the air passageway walls 136, permitting the flow of gaseous fuel from the gaseous fuel passageway 140 into the stagnation chamber 144 and ringed passageways 146 and finally through the mixing orifices 148 into the air passageway 134. The resultant fuel/air mixture exits the body 110 through the outlet of the air passageway 134.

Passing through the length of the body 10 is a circular throttle shaft 150, oriented so that it passes through the two lateral side surfaces, 170 and 172, of the upper part 32 which are adjacent to the lateral front surface 166 containing the gaseous fuel passageway inlet opening 142 and the throttle shaft 150 is substantially perpendicular to those side surfaces 170 and 172. The throttle shaft 150 is constrained to axial rotation by throttle shaft mounts 152 attached to the throttle body 132.

For each air passageway 134, a throttle butterfly plate 154 is mounted on the throttle shaft 150, supported by a longitudinal slot extending through the center of its substantially circular cross-section, along the length of the shaft that is within the air passageway 134. The air passageway throttle butterfly plates 154 are substantially circular plates with diameters slightly smaller than those of the air passageways 134, so that when the throttle shaft 150 is rotated appropriately, the air passageway butterfly plates 154 are oriented to substantially block the entire cross-sections of the air passageways 134.

A gaseous fuel passageway butterfly plate 156 is similarly mounted on the throttle shaft 150, along the length of the shaft that is within the gaseous fuel passageway 140. The gaseous fuel passageway butterfly plate 156 is a substantially circular plate with a diameter slightly smaller than that of the gaseous fuel passageway 140, so that when the throttle shaft is rotated to the position that blocks the air passageway 134 with the air passageway butterfly plate 154, the gaseous fuel passageway butterfly plate 156 is oriented to substantially block the entire cross-section of the gaseous fuel passageway 140.

In another embodiment, the electronic controller includes means for directly inputting gaseous fuel into the stagnation chamber 144 downstream of the gaseous fuel passageway butterfly plate 156 in order to facilitate finer control of the proper fuel/air ratio. Such means includes a fuel injection branch node along the gaseous fuel line between the primary pressure regulator/heat exchanger and the secondary pressure regulator/heat exchanger whereby some of the gaseous fuel is diverted into a fuel injection line. In this embodiment, the gaseous fuel travels along the fuel injection line to an electronic fuel injector, which, upon receiving appropriate signals from the electronic controller, injects an appropriate supplement of gaseous fuel into the stagnation chamber 144 of the throttle body 10, enriching the mixture.

The invention is described with greater particularity by the following claims. It should be understood that the use of terms such as "horizontal", "vertical", "top", "bottom", "front", "rear", etc. in the following claims is intended to describe only the orientation of the various components relatively to one another. It is not intended to otherwise limit the claims with respect to the actual orientation of the gaseous fuel control system components.

What is claimed is:

1. A gaseous fuel control system for a gaseously fueled engine, said system comprising:

a gaseous fuel supply;

a gaseous fuel passageway, said passageway having an inlet in communication with said supply;

a throttle body having inlet and outlet ends;

an air passageway wall defining an air passageway extending through said throttle body and intersecting said ends;

a stagnation chamber situated adjacent to said air passageway and a ringed passageway encircling said air passageway, said air passageway wall having mixing holes permitting flow of gaseous fuel into said air passageway from said stagnation chamber and said ringed passageway;

an air flow control located in said air passageway for controlling volume of airflow through said air passageway, said air flow control being located in said air passageway upstream of said mixing holes; and a gaseous fuel flow control located in said gaseous fuel passageway for controlling volume of gaseous fuel flow through said gaseous fuel passageway, said gaseous fuel flow control being located in said gaseous fuel passageway upstream of said stagnation chamber;

said air and gaseous fuel flow controls comprising individual throttle butterfly plates mounted on a common shaft for rotation and subject to a rotational force to orient said plates within said passageways such that said plates may variably obstruct flow.

2. A gaseous fuel control system in accordance with claim 1 wherein said system further comprises an electronic feedback loop, said feedback loop comprising a sensor and an implementing device for respectively measuring and affecting said composition of said resultant fuel/air mixture.

3. A gaseous fuel control system in accordance with claim 2 wherein said implementing device controls the pressure at which said gaseous fuel is mixed into said resultant fuel/air mixture.

4. A gaseous fuel control system in accordance with claim 3 wherein said implementing device comprises a rotary pressure regulator comprising:

a hollow cylinder with narrow longitudinal slots;

an open-ended, hollow cylindrical rotor with narrow longitudinal slots, housed within said hollow cylinder;

a passageway for conveying a gas into said rotor through said open end; and an actuator for rotating said rotor to adjust the extent to which said longitudinal slots of said rotor align with said longitudinal slots of said cylinder, thereby adjusting the exit pressure of said gas.

5. A gaseous fuel control system in accordance with claim 4 wherein said rotary pressure regulator is housed within said throttle body.

6. A gaseous fuel control system in accordance with claim 1 wherein said gaseous fuel flow control directly inputs said gaseous fuel into said stagnation chamber downstream of said throttle butterfly plates.

7. A gaseous fuel control system in accordance with claim 1 wherein said gaseous fuel supply is compressed natural gas.

8. A gaseous fuel control system in accordance with claim 1 wherein said throttle body comprises a plurality of air passageway walls defining a plurality of air passageways and a plurality of ringed passageways encircling said plurality of air passageways.

9. A gaseous fuel control system in accordance with claim 8 wherein said plurality of air passageways is 4 in number.

10. A gaseous fuel control system in accordance with claim 8 wherein said plurality of air passageways is 2 in number.

11. A gaseous fuel control system in accordance with claim 1 wherein said air passageway extending through said throttle body and intersecting said ends is substantially uniform in cross-section along and near the region of said passageway having said mixing holes.

12. A pressure regulator for a fuel control system of a gaseously fueled engine housed in a throttle body wherein said pressure regulator comprises:

a hollow cylinder with narrow longitudinal slots;

an open-ended, hollow cylindrical rotor with narrow longitudinal slots, housed within said hollow cylinder;

a passageway for conveying a gas into said rotor through said open end; and an actuator for rotating said rotor to adjust the extent to which said longitudinal slots of said rotor align with said longitudinal slots of said cylinder, thereby adjusting the exit pressure of said gas; and wherein said throttle body comprises:

an air passageway wall defining an air passageway extending through said throttle body and intersecting said ends;

a stagnation chamber situated adjacently to said air passageway and a ringed passageway encircling said air passageway, said air passageway wall having mixing holes permitting flow of gaseous fuel into said air passageway from said stagnation chamber and said ringed passageway;

an air flow control located in said air passageway for controlling volume of airflow through said air passageway, said air flow control being located in said air passageway upstream of said mixing holes; and a gaseous fuel flow control located in said gaseous fuel passageway for controlling volume of gaseous fuel flow through said gaseous fuel passageway, said gaseous fuel flow control being located in said gaseous fuel passageway upstream of said stagnation chamber and downstream of said pressure regulator.

* * * * *